UNITED STATES PATENT OFFICE.

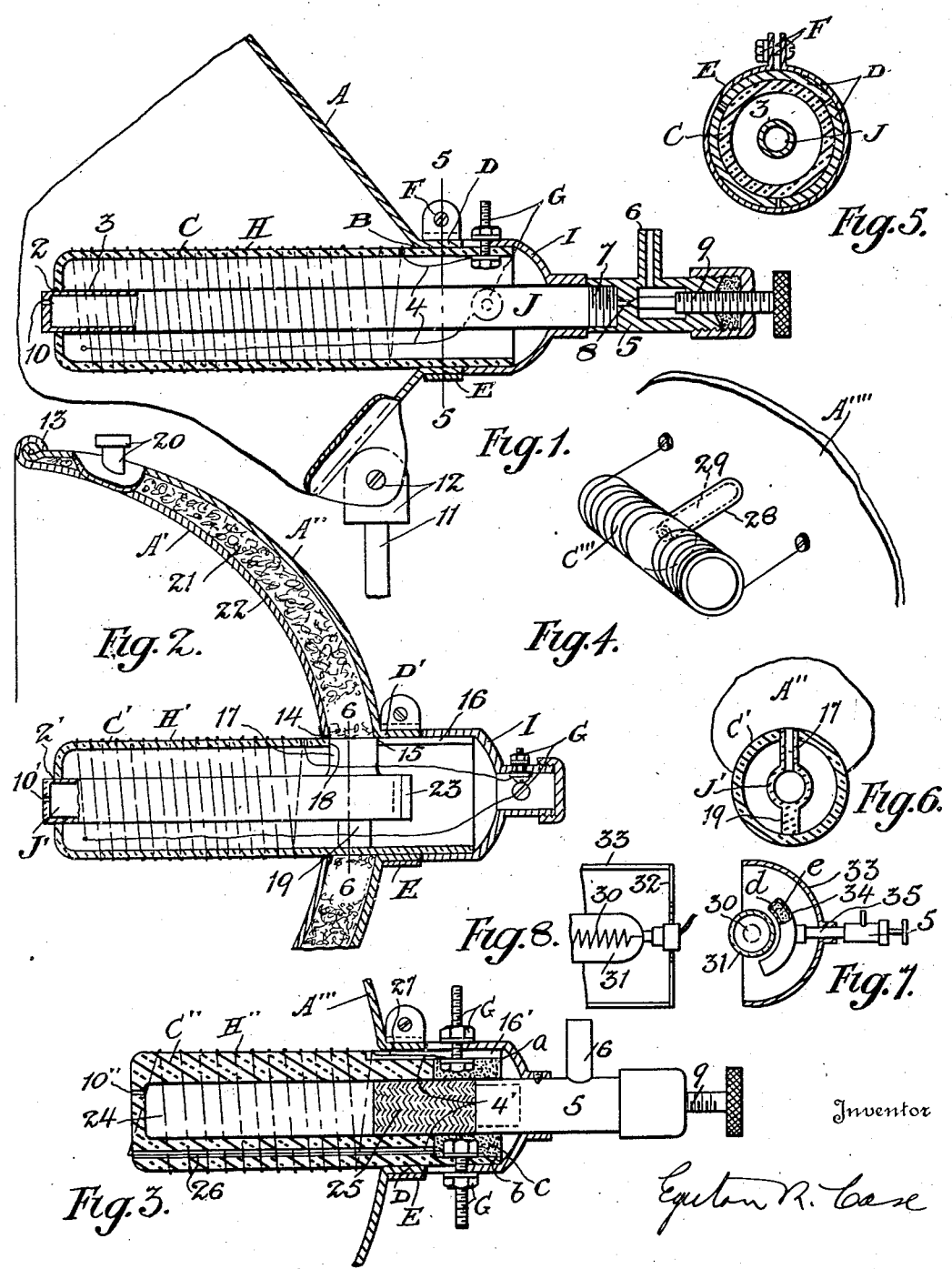

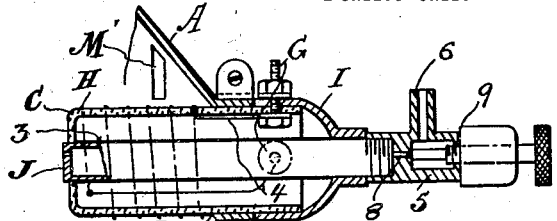
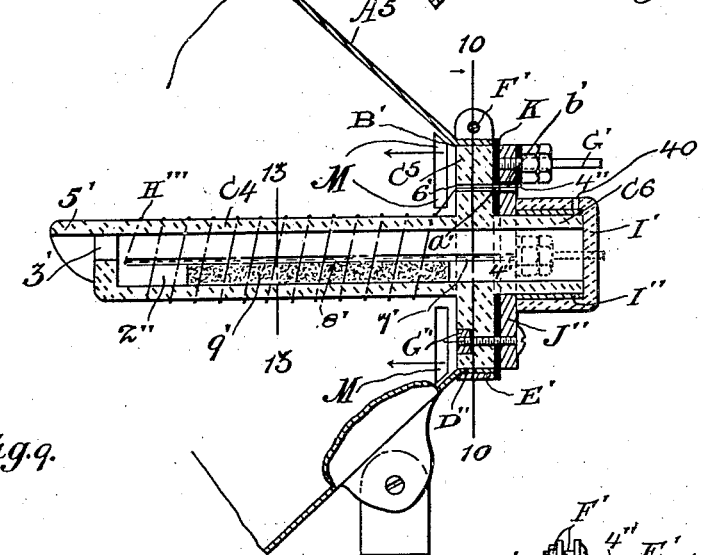
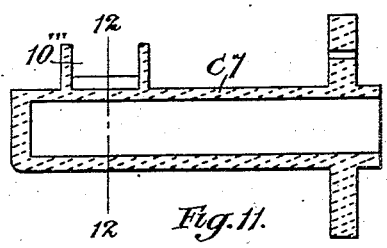
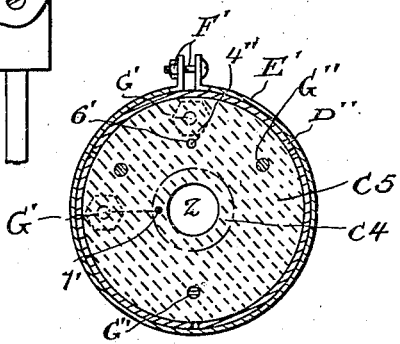
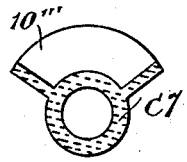
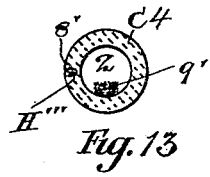

EGERTON RYERSON CASE, OF TORONTO, ONTARIO, CANADA.

METHOD OF AND MEANS FOR TREATING AIR.

1,378,094.     Specification of Letters Patent.     Patented May 17, 1921.

Application filed March 22, 1920. Serial No. 367,905.

*To all whom it may concern:*

Be it known that I, EGERTON RYERSON CASE, of the city of Toronto, county of York, Province of Ontario, Dominion of Canada, a subject of the King of Great Britain, have invented a certain new and useful Method of and Means for Treating Air, of which the following is a specification.

My invention relates to a method of and means for treating air, and the principal object of the invention is to treat air into which is passed heat waves or rays of electrical origin reflected from a reflector of a convenient form, with a suitable liquid or non-liquid treating agent, so as to humidify the air in a room, or for the purpose of treating those suffering from whooping cough, or bronchitis, or other bronchial affections, as well as those suffering from throat and lung affections that can be treated in this manner; to supply an insecticide to air in a conservatory containing plants, and to supply a fumigating or deodorizing agent to the air in a room to purify the same. Another object of the invention is to expedite the dissemination of the treating agent throughout the room.

Several forms of apparatus within my invention will be hereinafter particularly described as exemplary means whereby the objects thereof may be readily and economically carried out, and what I claim as new will be set forth in the claims forming part of this specification.

Figures 1, 2, 3, and 7 are vertical central longitudinal sections through apparatus within my invention showing different embodiments thereof, as well as different forms of reflectors, adapted for distributing a liquid treating agent. Fig. 4 is a perspective view, in fragmentary form, of another form of apparatus within my invention. Fig. 5 is a vertical cross section on the line 5—5, Fig. 1. Fig. 6 is a vertical cross section on the line 6—6, Fig. 2. Fig. 8 is a front elevation of portion of the apparatus illustrated in Fig. 7. Figs. 9 and 14 are vertical central longitudinal sections through forms of apparatus within my invention, showing the reflectors apertured to permit the flow of currents of air therethrough, the form in Fig. 9 being adapted to supply a non-liquid treating agent to the air. Fig. 10 is a vertical cross section on the line 10—10, Fig. 9. Fig. 11 is a vertical central longitudinal section through a modified form of holder for a treating agent. Fig. 12 is a vertical cross section on the line 12—12, Fig. 11, and Fig. 13 is a vertical cross section on the line 13—13, Fig. 9.

In the drawings, like characters of reference refer to the same parts.

The reflected heat waves or rays used in putting my method into practice, are of electrical origin because heat generated thereby can be readily controlled by opening and closing the circuit, thus obviously producing economy in operation in many cases.

It is well-known to heating and ventilating engineers that air in a room possessing the proper percentage of humidity does not require to be kept at so high a temperature as when it is lacking in humidity. Therefore, for a given period, an apparatus within my invention can be used to heat a room at the minimum of expense.

Several forms of electric heaters are in common use whereby heat waves or rays are projected into a room in a column or shaft by means of a more or less highly polished suitable reflecting surface, but none of these heaters possess means for supplying water vapor or other treating agent to the air. Since these heaters find their greatest efficiency in heating small rooms or offices, generally occupied for several hours at a time, they should be equipped with a suitable treating-agent supplying means.

In the forms of my invention illustrated in Figs. 1 to 8, inclusive, the reflected heat waves or rays largely control the currents of air circulating in a room, and it is by means of such air currents that the treating agent is distributed.

Since the quantity of treating agent designed to be held by my contrivance at any one moment is relatively quite small, and is preferably located in intimate proximity to the source of heat, it naturally follows that very little time elapses before the treating agent is transformed into the desired state.

It will, of course be understood that any suitable form of reflector may be used. The particular form of treating-agent holding-means, and the constructions and designs whereby suitable electric connections are had, and the particular construction illustrated for controlling or obtaining a supply of a treating agent, are not essential to the inventior.

Obviously, a fluid treating-agent may be introduced into the current of reflected heat waves or rays at any convenient place or point and in any convenient form. For example, an atomized spray may be introduced into the current of reflected heat waves or rays to be afterward changed into vapor by the heat thereof, and such atomized spray, for example, may issue from the ducts in the different forms of fluid-supplying means hereinafter referred to.

The base or member supporting the resistor, may be of any suitable material well-known in the art, such as porcelain, or fused silica.

In Fig. 1, the reflector A is in the form of a cone with the apex removed, leaving an opening B through which extends the base C. A suitable construction for holding the said base in the said reflector may be conveniently in the form of a split flange D, which is embraced by a divided ring E, whose ends are drawn together by means of a nut and bolt designated by the common numeral of reference F. The said base preferably projects beyond the said flange D and supports any suitable electric terminals such as the binding posts G to which are connected the ends 4 of the resistor H mounted in any suitable manner on the said base. A cap I incloses the open end of the said base, and is held in place by any suitable means such as the binding posts G. A tube J extends through the cap I and also through the base C and projects through an aperture 2 formed in said base. The said tube is preferably surrounded by a sleeve 3 of suitable insulating material so as to prevent any possibility of the ends 4 of the resistor H coming in contact with said tube in case it be made of current-conducting-material, as is the case in the illustration. The said sleeve insulates the said tube from the cap I. A valve-casing 5 is provided with a branch 6, whereby the fluid is conducted by any suitable means (not shown) from a suitable source of supply (not shown). The end 7 of the tube J may conveniently support the valve-casing 5, as shown, and through the duct 8 in said valve-casing, fluid is conducted to said tube. A well-known form of valve 9 is mounted in the said valve-casing to control the supply of fluid.

As is well-known by one skilled in the art, the supporting parts for the resistor H become rapidly heated, and in fact the base C becomes practically incandescent. The result will be that the fluid within the tube J will very shortly be brought to a very high temperature, so that the steam or vapor generated will escape from the said tube through the duct 10, and into the current of heat-rays emitted by the resistor H, and these rays will be reflected and thrown outward into the room by the reflector A.

If desired, the reflector A may be carried by a support 11, to which it has pivotal connection, as shown at 12, so as to permit the radiator to be moved into different positions, so as to change the direction of movement of the heat-rays as they are reflected by the reflector A.

The duct 10 is preferably positioned above the center of the tube J so that this tube will contain quite a supply of fluid in the initial stage, without the fluid passing through the duct. The duct will preferably be so small in fact as to practically prevent the passage or escape of fluid therefrom. So soon as the various parts described become thoroughly heated, the fluid escaping from the valve-casing 5 into the tube J will begin to be vaporized, and except when the radiator is first started, there will be practically very little, if any, fluid in the tube.

In certain of the described forms of my invention, there will not be sufficient fluid within the apparatus to generate sufficient steam or vapor to be dangerous.

In the form of my invention illustrated in Fig. 2, the reflector is concaved or disk-shaped, or parabolic, and is composed of a front member A′, and a rear member A″. The outer edges of these reflectors are suitably coupled together as shown at 13, and where the base C′ passes through these members, are formed openings 14 and 15. The upper side of the base C′ is slotted as shown at 16, and one portion of this slot opens into the chamber 22, between the two members A″ and A′. The tube J′ is mounted within the base C′, and one end thereof projects through a hole 2′ formed in the closed end of the said base. Carried by said tube and opening thereinto is a duct 17 which is in communication with the chamber 22. As the said tube J′ is passed into the base C′, the duct 17 passes into the slot 16, and coming in contact with the end 18 of the said slot, is positioned as shown. A lug 19, secured to, or formed a part of, the said tube J′, supports one end of this tube and maintains the duct 17 in proper position. One segment of the split ring D′ is slightly sprung as the duct 17 passes thereunder, so as to hold the said tube and duct against longitudinal displacement. Carried by the reflector is a filling means 20 of well-known construction, and through this means the fluid is passed into the chamber 22, and saturates the filler 21, made of any suitable incombustible material such as asbestos or mineral wool. As the current heats the resistor H′, in a short while the heat will generate vapor in the chamber 22, and thus vapor will pass through the duct 17 into the tube J′ and escape thereout of through the duct 10′. Any suitable cap 23, closes the housed end of the said tube J′.

In this form of the invention, the tube J′ may be made of suitable insulating material, well-known in the art, and the inner side thereof should preferably be coated with a suitable fireproof cement or paint to prevent the escape of fluid through the pores of the tube. In the embodiment disclosed in Fig. 3, the base C'' is supported in the reflector A''' in any convenient manner; if desired, as before described in connection with the other forms of my invention, and the same carries the resistor H''. The inner ends 4' of the said resistor are coupled to any suitable binding posts G. The base in this case is bi-functional in that it not only carries the resistor, but it also receives fluid in the chamber 24, from which opens the duct 10'' in the closed end of said base. Mounted in one portion of said chamber is a wick 25 made of any suitable material either naturally or artificially incombustible, which preferably extends into the valve-casing 5 and is held therein to prevent the wick from traveling toward the opposite end of the base C'' and closing the duct 10''. This wick will prevent any possibility of the flooding of the chamber 24 through carelessness on the part of the user. As only a small flow of fluid is designed to be passed through the valve-casing 5, the use of the said wick is not absolutely essential. In one wall of the base C'' is a passage-way 26 through which the return end of the resistor H'' is passed. The slot 16' in this form of invention is extended as to permit the housing of the portion 27 of the resistor H''.

After the ends 4' of the resistor H'' have been coupled to the binding-posts G, the chambers $a$ and $b$, formed in the walls of said base C'', are plugged by any suitable paste or cement $c$.

The chamber 24 will be also preferably lined with any suitable fireproof cement or paint to prevent the fluid passing through the pores of the base C'' in case the same be sufficiently porous.

In the form of my invention illustrated in Fig. 4, the base C''' occupies a position at right angles to the other bases, and is supported in the reflector A'''' by a sleeve 28 which opens into the interior of said base. A conduit or tube 29 passes through the reflector, and into the sleeve 28 so as to introduce vapor within the base C'''.

In the form of my invention illustrated in Figs. 7 and 8, the resistor 30 is mounted within a suitable casing 31, which casing is suitably supported in the ends 32 of the reflector 33. Mounted in this reflector, and behind the casing 31, is a chamber 34, which is coupled by the conduit 35 to the valve-casing 5. The chamber 33 is provided with a duct $d$, and may have a suitable filling $e$. The said chamber is curved, as shown, so as to conform more or less to the shape of the casing 31, so as to permit the fluid within the chamber to be readily vaporized.

As before set forth, I can use a certain form of my invention as a fumigator or deodorizer, and in Fig. 9 I have disclosed one form of apparatus to be used as a fumigator whereby a non-liquid fumigating agent is supplied to the air. A⁵ is the reflector provided with an opening B' through which extends the base or holder C⁴. This base or holder is provided with a flange C⁵ around which is clamped the split flange D'', which is embraced by a divided ring E', whose ends are drawn together by means of a nut and bolt commonly designated F'.

Surrounding the rear portion C⁶ of the base or holder C⁴ is a metal plate J'' which is separated from the flange C⁵ by any suitable insulating material K, in the design illustrated, so as to insulate the plate J'' from the flange D'' and ring E'.

Suitably mounted in the plate J'' are any suitable electric terminals such as the binding posts G' to which I connect the ends 4''' of the resistor H''' associated in any suitable manner with the said base or holder.

Suitable means may be used to couple the plate J'' to the flange C⁵ such as nuts and bolts commonly designated G'''.

Closing the rear portion C⁶ of the base or support C⁴, is a cap I', preferably of the same material as that composing the said base or holder, and interposed between this cap and the rear portion C⁶ is a suitable bushing I'' to permit of the ready removal and placing of said cap for the purpose of placing the non-liquid treating agent within the base or holder C⁴ which is chambered for that purpose. Opening into the chamber 2'' of the said base or holder is a vent 3' through which fumes, gas, or smoke escapes. If desired, a lip 5' may be located above the vent 3' to assist in directing outwardly the flow of the said gas, fumes, or smoke.

The ends of the resistor H''' are passed through the holes 6' and 7' formed in the flange C⁵ and through holes $a'$ and $b'$ formed respectively in the insulating material K and the plate J'' and the portion of the resistor connected to the end passing through the hole 7' is preferably buried in the longitudinal groove 8' formed in one side of the base or holder C⁴, and which groove is afterward closed. 9' represents the treating agent mounted within the chamber 2'' of the base or holder C⁴, and this treating agent may be of any desired substance, in non-liquid form, such as sulfur, formaldehyde, or spent oxid of iron.

Formed in the reflector A⁵ are one or more openings M suitably located so that air currents may pass through said openings into the reflector and expeditiously convey the treating agent into the circulating air currents in the room. Since the temperature of the air at the front side of the reflector will be much higher than that at the rear side thereof, it is reasonable to assume that currents of air will flow through the openings M in the direction indicated by arrows.

In the form of base or holder C⁷ illustrated in Figs. 11 and 12, an open trough 10''' is provided to receive the treating agent.

If necessary, an opening 40 may be formed in the cap I', so that if this cap be pulled outward far enough, air will escape through said opening into the chamber 2''. By shoving this cap home, the opening 40 may be closed.

In the form of apparatus disclosed in Fig. 14, I show the reflector A as provided with one or more openings M' through which air may pass.

Of course, it will be understood that I do not confine myself to using the openings in the reflector.

While I have described what I consider to be the best embodiments of my invention, I desire it to be understood that the principle can be embodied in many different forms and I desire not to be limited beyond the requirements of the prior art and the terms of my claims.

What I claim is:

1. The method of treating air for various purposes, which consists in supplying a treating agent to air into which is passed reflected heat waves or rays, generated by electric current.

2. The method of treating air for various purposes, which consists in supplying a vaporized treating agent to air into which is passed reflected heat waves or rays generated by electric current.

3. The method of treating air for various purposes which consists in transforming the treating agent by heat electrically generated into a suitable state, and then supplying said transformed treating agent to air into which is passed reflected heat waves or rays generated by electric current.

4. The method of treating air for various purposes, which consists in transforming a treating agent by heat electrically generated into a vapor, and then supplying said vapor to air into which is passed reflected heat waves or rays generated by electric current.

5. The method of treating air which consists in supplying a treating agent to air heated by reflected heat waves or rays generated by electric current.

6. The method of treating air which consists in supplying a vaporized treating agent to air heated by reflected heat waves or rays generated by electric current.

7. The method of treating air for various purposes which consists in transforming a treating agent by heat electrically generated into a suitable state, and then supplying the said transformed treating agent to air heated by reflected heat waves or rays generated by electric current.

8. The method of treating air which consists in transforming a treating agent by heat electrically generated into vapor, and then supplying said transformed treating agent to air heated by reflected heat waves or rays generated by electric current.

9. The method of treating air which consists in producing reflected heat waves or rays of electrical origin in the air, and supplying a treating agent to the air, the temperature of which is raised by said reflected heat waves or rays.

10. The method of treating air which consists in producing reflected heat waves or rays of electrical origin in the air, and supplying a vaporized treating agent to the air, the temperature of which is raised by said reflected heat waves or rays.

11. The method of treating air which consists in producing reflected heat waves or rays of electrical origin in the air; transforming a treating agent by heat electrically into a suitable state, and then supplying said treating agent to the air.

12. The method of treating air which consists in setting up currents of air by producing reflected heat waves or rays of electrical origin in the air, and supplying a treating agent to the air currents.

13. The method of treating air which consists in setting up currents of air by producing reflected heat waves or rays of electrical origin in the air; producing auxiliary air currents, and supplying a treating agent to the air in a room by means of said auxiliary air currents.

14. The method of treating air which consists in supplying a treating agent to air into which is passed reflected heat waves or rays of electrical origin, and expediting the dissemination of the treating agent by auxiliary air currents.

15. The method of treating air which consists in supplying a treating agent to air currents induced by difference in temperature between two separated portions of a body of air caused by reflected heat waves or rays generated by electric current.

16. The method of treating air which consists in transforming a treating agent by heat electrically generated into a suitable state, and then supplying said treating agent to air currents induced by difference in temperature between two separated portions of a body of air caused by reflected heat waves or rays generated by electric current.

17. The method of treating air which consists in passing a treating agent into an induced current of air flowing in substantially the same direction as reflected heat waves or rays generated by electric current.

18. An apparatus for treating air, including electric heat-wave-producing means; means to reflect said heat waves, and means to supply a vapor generated from fluid to air heated by said reflected heat waves.

19. An apparatus for treating air including electric heat-wave-producing means; means to reflect said heat waves; means carrying a treating agent, and means controlling the supply of treating agent to said treating-agent carrying-means.

20. An apparatus for treating air, including electric means for producing heat waves; means to reflect said heat waves, and means to supply a treating agent to air heated by said reflected heat waves.

EGERTON RYERSON CASE.